Patented Feb. 3, 1925.

1,524,872

UNITED STATES PATENT OFFICE.

EARL H. McLEOD AND WALTER W. MOCK, OF RUTHERFORD, NEW JERSEY.

PRINTING INK.

No Drawing.     Application filed August 6, 1920. Serial No. 401,811.

*To all whom it may concern:*

Be it known that we, EARL H. McLEOD, and WALTER W. MOCK, citizens of the United States, residing at Rutherford, in the county of Bergen and State of New Jersey, have invented new and useful Improvements in Printing Inks, of which the following is a specification.

This invention relates to the manufacture of printing inks, especially those intended for news-print paper and has for its particular objects the production of a relatively cheap ink for the aforesaid purpose possessing even superior working qualities as compared with other more expensive printing inks.

Heretofore, as we are well aware, relatively small amounts of water, for example not exceeding some two per cent, have been present in certain printing inks especially inks made from deflocculated carbon and also other special inks such as those made, without pre-drying, from "pulp colors" but the amount of the same was so small as to exert practically no beneficial influence upon the other ingredients, and in fact it has always been considered a desideratum to keep the water content of said inks at a minimum.

Our investigations have led to the discovery that, contrary to expectations, a very substantial quantity of water exerts a very beneficial influence upon inks intended for news-print paper, since not only does it aid in the formation of an emulsion or emulsoid ink having excellent working properties, but the introduction of the same, notwithstanding the advantages resulting therefrom, actually decreases the cost of the finished product. Furthermore, we have discovered that a satisfactory ink carrying substantial quantities of water in its menstrum, can be made without the employment of any other emulsifying agent than the oil vehicle and the pigment, especially when employing carbon black and certain petroleum oils.

In carrying out our invention we preferably proceed as follows:

When operating without an emulsifying agent, as such, a mixture comprising about twelve per cent of carbon black (lamp black) is agitated with sixty-eight per cent of petroleum oil, for example a heavy black residuum oil of asphaltic base (.941 S. G.) and twenty per cent of water for a period of say from one-half to two hours until a very thorough admixture of the same is procured. Owing to the emulsification power of both the carbon black and the petroleum oil the foregoing mixture will produce a very satisfactory printing ink for the purpose herein stated.

When it is desired to employ an emulsifying agent, a very satisfactory ink can be produced by intimately mixing, in the manner above described, nine per cent of carbon black (lamp black), fifty-four per cent of the aforesaid petroleum oil, twenty-six per cent of water and eleven per cent of an emulsifying agent, the latter comprising equal parts of petroleum oil and water with about ten per cent, by weight of such mixture of oil and water, of metallic soap and five per cent of borax respectively. Such emulsifying agents are, however, compositions well known in the art and as such form no part of our invention.

While we preferably employ a mixture which includes at least about twenty per cent (20%) of water, we may, without departing from the spirit of our invention, employ amounts of water both above and below these percentages; for example, in some mixtures we may employ not less than ten per cent (10%) of water and not over thirty per cent (30%) of water, in others not less than fifteen per cent (15%) of water and up to seventy-five per cent (75%) of water; in others in excess of ten per cent (10%) of water and in others from fifteen (15) to thirty per cent (30%) of water. Likewise, in certain mixtures where the water ingredient exceeds twenty-six per cent (26%) of water obviously the oil ingredient will be correspondingly less or else the pigment ingredient may be increased or decreased with respect to the percentage of pigment which is employed in examples above recited, but in no event should the percentage of pigment exceed the percentage of the oil vehicle.

Preferably the percentage of the pigment is less than the lowest percentage of both water and also of the oil vehicle which are employed—in other words, a minor percentage of pigment is employed. If the water is present in a percentage as low as ten per cent (10%) then the percentage of pigment may be less than the water percentage. Wherever herein we have referred to a minor percentage of pigment, either in the specification or claims, we refer to a percentage which is less than either the percentage of the oil vehicle or of the water in the mixture employed.

In the aforesaid news ink in which the emulsifying agent has been incorporated, the water will be present in what might be termed either the internal or external phase of the emulsion, depending upon the character of the emulsion employed. For example, when the emulsifying agent is soluble in the water, the water will be present in the external phase and on the other hand if the emulsifying agent is soluble in the oil and the water insoluble, the latter will be present in the internal phase.

In the manufacture of our improved inks it is desirable, after the ingredients have been agitated together as above described, to grind the mixture in a suitable mill in order to obtain as smooth a mixture as possible.

Among the metallic soaps which are particularly suitable for the manufacture of the aforesaid nucleus, are the soaps produced by the combination of salts of sodium, potassium, calcium, barium, strontium, magnesium, aluminum, etc. with organic acid or oils as stearic, oleic, palmitic or resin acids, cocoanut, peanut, linseed, tung, castor, soya-bean or lard oil etc. The borax in such nucleus serves as a preservative or stabilizer and obviously other compounds having similar properties may be used in lieu thereof.

Among the chief advantages of our improved ink are that they work easier than ordinary news ink, the half tones produced therefrom have less of a brownish tinge, the "solids" are denser, the ink shows less tendency to strike through the paper, and the print, particularly on news-print paper, is less easily rubbed off.

The soaps produced from monovalent metal salts as sodium and potassium are generally water soluble whereas the soaps made from the polyvalent metals as calcium, barium, strontium, magnesium, aluminium etc., are generally soluble in oil but insoluble in water.

No claim is made herein to inks containing less than 7.5% of water-and oil--insoluble pigment, nor less than 10% water in the vehicle carrying such pigment.

No claim is made herein to inks containing less than 25% of oil and wherever the expression major percentage of oil is employed in the claims it has reference to a percentage greater than that of any other single ingredient of the ink mixture.

Having thus described our invention, what we claim is:

1. A printing ink suitable for newspaper printing comprising an emulsion of an oil vehicle, a minor per cent of a water-and oil-insoluble pigment, at least ten per cent of water and an emulsifying agent, the amount of oil exceeding twenty-five per cent.

2. A printing ink suitable for newspaper printing comprising an emulsion of an oil vhicle, a minor per cent of a water-and oil-insoluble coloring medium and water, the amount of water exceeding ten per cent and the amount of oil exceeding twenty-five per cent.

3. A printing ink suitable for newspaper printing comprising an emulsion containing a major percentage of an oil vehicle, a minor per cent of a water-and oil-insoluble pigment and an intermediate percentage, not less than ten per cent, of water.

4. A printing ink suitable for newspaper printing comprising an emulsion containing an oil vehicle, a minor per cent of a water- and oil-insoluble pigment, from ten to thirty per cent of water and an emulsifying agent which is miscible with the oil vehicle.

5. A printing ink suitable for newspaper printing comprising an emulsion containing a major percentage of an oil vehicle, a minor per cent of a water-and oil-insoluble pigment and an intermediate percentage, not less than fifteen per cent, of water.

6. A printing ink suitable for newspaper printing comprising an emulsion containing a major percentage of an oil vehicle, a minor per cent of a water-and oil-insoluble pigment and between fifteen and seventy-five per cent of water.

7. A printing ink suitable for newspaper printing comprising an emulsion containing a major percentage of an oil vehicle, a minor per cent of a water-and oil-insoluble pigment and from fifteen to thirty per cent of water.

8. A news ink, comprising in excess of seven and one-half per cent of carbon black pigment and amount of petroleum oil exceeding fifty per cent of the weight of the total pigment-carrying-vehicle and more than ten per cent of water.

9. A news ink, comprising in excess of seven and one-half per cent of a water-and oil-insoluble coloring matter, more than ten per cent of water, an amount of petroleum oil in excess of the amount of water and a relatively small amount of an emulsifying agent comprising a polyvalent metal soap which is soluble in said oil vehicle.

Signed at New York city in the county and State of New York this 5th day of August, 1920.

EARL H. McLEOD.
WALTER W. MOCK.